United States Patent [19]

Davis

[11] Patent Number: 4,620,714

[45] Date of Patent: Nov. 4, 1986

[54] AMBULATORY WHEELSTAND

[76] Inventor: Daniel W. Davis, 3213 Beechwood St., Flint, Mich. 48506

[21] Appl. No.: 613,141

[22] Filed: May 23, 1984

[51] Int. Cl.[4] .......... A61H 3/04; B62M 1/14

[52] U.S. Cl. .......... 280/242 R; 5/62; 272/70.3; 280/208; 280/242 WC; 280/289 WC; 296/20; 297/5; 297/DIG. 4; 403/97; D12/130

[58] Field of Search ... 280/242 R, 242 WC, 289 WC, 280/208, 224, 225, 232, 233, 259, 86; 180/907, 313, 1; 297/DIG. 4, DIG. 10, 5, 6; 108/1; 403/97; D12/130; 272/70.3, 70.4, 127, 144, 145, 146

[56] References Cited

U.S. PATENT DOCUMENTS

| | | | |
|---|---|---|---|
| 2,003,844 | 6/1935 | Tintner | 403/97 |
| 2,295,006 | 9/1942 | Philips | 5/62 |
| 2,572,149 | 10/1951 | Hind et al. | 297/DIG. 10 X |
| 2,986,200 | 5/1961 | Nobile | 297/DIG. 4 X |
| 3,216,738 | 11/1965 | Bockus | 297/DIG. 4 X |
| 3,249,368 | 5/1966 | Ginzburg | 280/242 R X |
| 3,618,968 | 11/1971 | Greer | 297/DIG. 4 X |
| 4,310,167 | 1/1982 | McLaurin | 280/242 WC X |
| 4,326,732 | 4/1982 | Gall et al. | 280/242 WC X |

*Primary Examiner*—John J. Love

*Assistant Examiner*—Mitchell J. Hill

*Attorney, Agent, or Firm*—Gifford, Groh, VanOphem, Sheridan, Sprinkle & Dolgorukov

[57] ABSTRACT

The present invention discloses a wheelstand for handicapped or immobile persons having a generally rectangular main frame rotatably supported on a ground support surface by relatively small wheels while larger wheels are rotatably mounted to the frame and manually rotated by the user in order to propel the frame. A generally planar body support structure is pivotally carried by the frame so that the angular position of the support structure can be varied with respect to the frame while still enabling the user to grip the larger wheels and propel the wheelstand.

13 Claims, 7 Drawing Figures

AMBULATORY WHEELSTAND

BACKGROUND OF THE INVENTION

I. Field of the Invention

This invention relates to ambulatory devices for physically handicapped or immobilized persons, and in particular, to a multiple position wheelstand for providing mobility and support for such persons.

II. Description of the Prior Art

Past devices which provide mobility and support for physically handicapped persons consist essentially of wheelchairs and standing prone boards. Although quite suitable for their particular functions, neither device provides the convenience and flexibility of the present invention.

Wheelchairs have been in extensive use for many years and have become the standard means for transporting physically handicapped or immobilized persons. Most wheelchairs comprise two large spoked wheels attached to the rear portion of the chair and two smaller, caster-type wheels in front. The size and design of the rear wheels enables the user to propel him or herself without the aid of a second person. On most wheelchairs, the seat and back support are made of a pliable material to allow the chair to be folded for storage. Moreover, many wheelchairs are also provided with numerous safety features including anti-tipping components, safety brakes and collapsible foot rests.

Standing prone boards are also designed for use by phusically handicapped persons and support the user in a prone position. These prone boards are adjustable to a plurality of different angular positions and support and padding are provided at critical positions to increase the comfort of the user. Most of the prone boards are also provided with casters to permit mobility.

Although these prior devices are quite functional, each has its own inherent disadvantages. The wheelchair, although providing increased mobility, requires the user to remain in the sitting position thereby increasing muscle atrophy because of the lack of use or exercise, particularly in the lower extremities. Moreover, the wheelchair is limited in its uses because the user is retained in a single position making it difficult to reach the floow or elevated objects.

Similarly, the standing prone board has limited use because of its structure. Although capable of being adjusted to numerous heights and different angles it is difficult for the user to propel the prone board. Furthermore, the standing prone board is a bulky device incapable of storage or transportation in a conventional vehicle.

SUMMARY OF THE PRESENT INVENTION

The present invention is an improved ambulatory device which overcomes all of the disadvantges of the previously known ambulatory devices for physically handicapped and immobilized persons.

The wheelstand according to the present invention comprises generally two large spoked wheels capable of being gripped and rotated by the user, two smaller caster type wheels for stability and maneuverability, and an adjusable support structure designed to support the user in a variety of positions. The support structure comprises two adjustable foot rests, single or dual handle bars and a planar torso support which connects the foot rest to the handle bars. Also included are means for attaching anti-tipping wheels which provide additional stability.

The wheelstand is adjustable to a variety of angular and longitudinal positions and accommodated users of varying size. In each position, however, the user can grip the larger wheels to propel him or herself. The primary means for adjusting the angular position of the user from the horizontal through the vertical is accomplished by a linkage located just beneath the user's torso and attached to the support structure and base structure. The footrests and handle bars are adjustable to accomodate different user sizes.

The present invention overcomes the disadvantages of the prior art by providing greater flexibility of use while providing means whereby the device can be easily disassembled and collapsed for storage and transportation. Moreover, the user support structure may be easily interchanged to provide support structures of varying size and structure. The device, unlike the wheelchair, also increases muscle use thereby slowing muscle atrophy, especially the lower body and leg muscles. The wheelstand is also capable of use for a variety of activities from full vertical activities to ground level activities. However, unlike the prone board of the prior art the present invention can be easily stored and transported and is capable of being propelled by the user simply by rotating the large, easily accessible wheels.

Other objects, features and advantages of the invention will be apparent from the following detailed description taken in connection with the accompanying drawings.

BRIEF DESCRIPTION OF THE DRAWINGS

The present invention will be more fully understood by reference to the following detailed description of the preferred embodiment of the present invention when read in conjunction with the accompanying drawings, in which like reference characters refer to like parts throughout the views, and in which.

DETAILED DESCRIPTION OF A PREFERRED EMBODIMENT OF THE INVENTION

Figure 1:
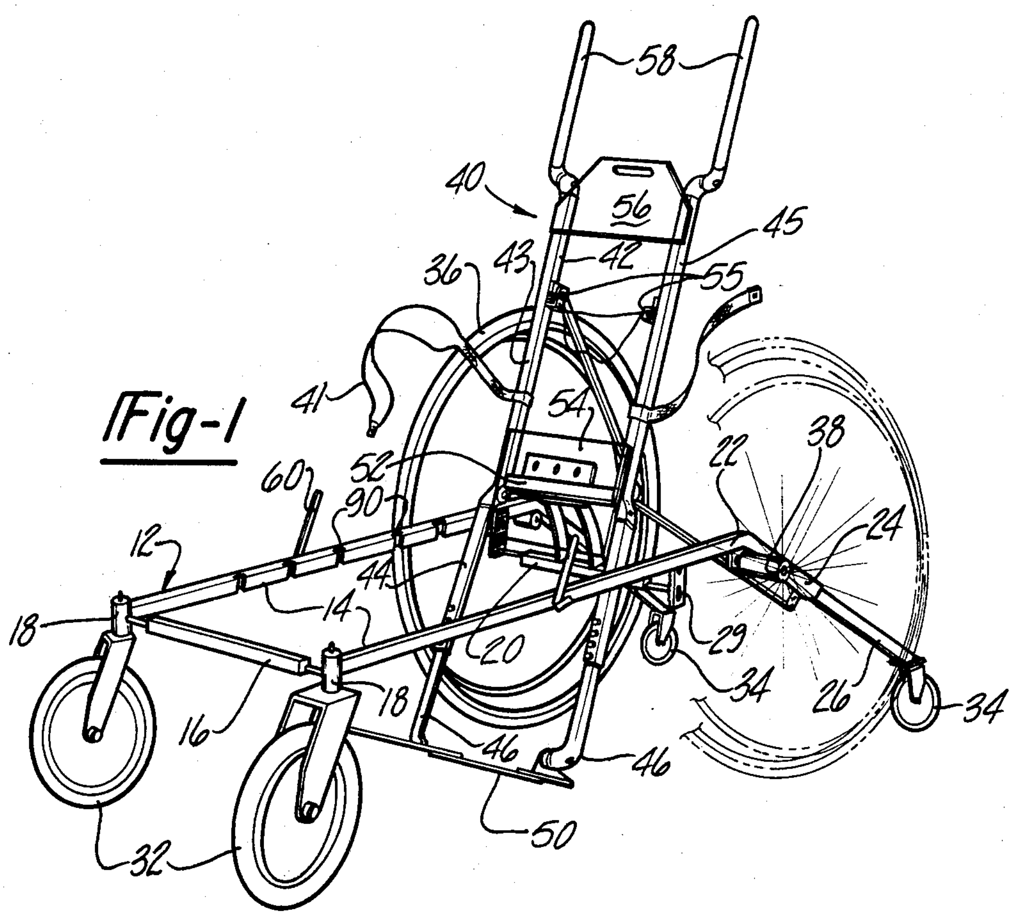
FIG. 1 is an elevated perspective view of the preferred embodiment of the present invention.

With reference first to FIG. 1, a preferred embodiment of the wheelstand of the present invention is thereshown and comprises a generally rectangular frame 12 having a pair of spaced and parallel lateral supports 14. A rear cross-support 16 extends between and secures the rear ends 18 of the lateral supports 14 together while, similarly, a front cross-support 20 extends between and secures the front ends 22 of the lateral supports 14 to each other.

Figure 2:
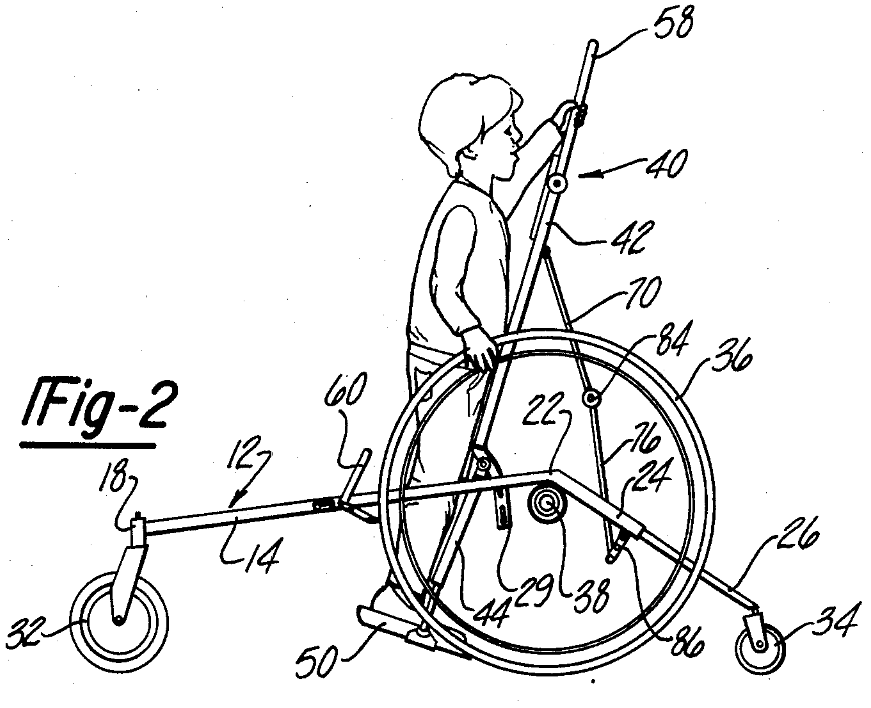
FIG. 2 is a side plan view of the present invention in the fully vertical position.

With reference still to FIGS. 1 and 2, a sleeve 24 is secured to and extends downwardly from the front end 22 of each lateral support 14. An elongated extension 26 is slidably received within the interior of each sleeve 24 while conventional means 28 (FIG. 6) are provided to adjustably lock the extension 26 to the sleeve 24 for reasons to be subsequently described.

Figure 6:
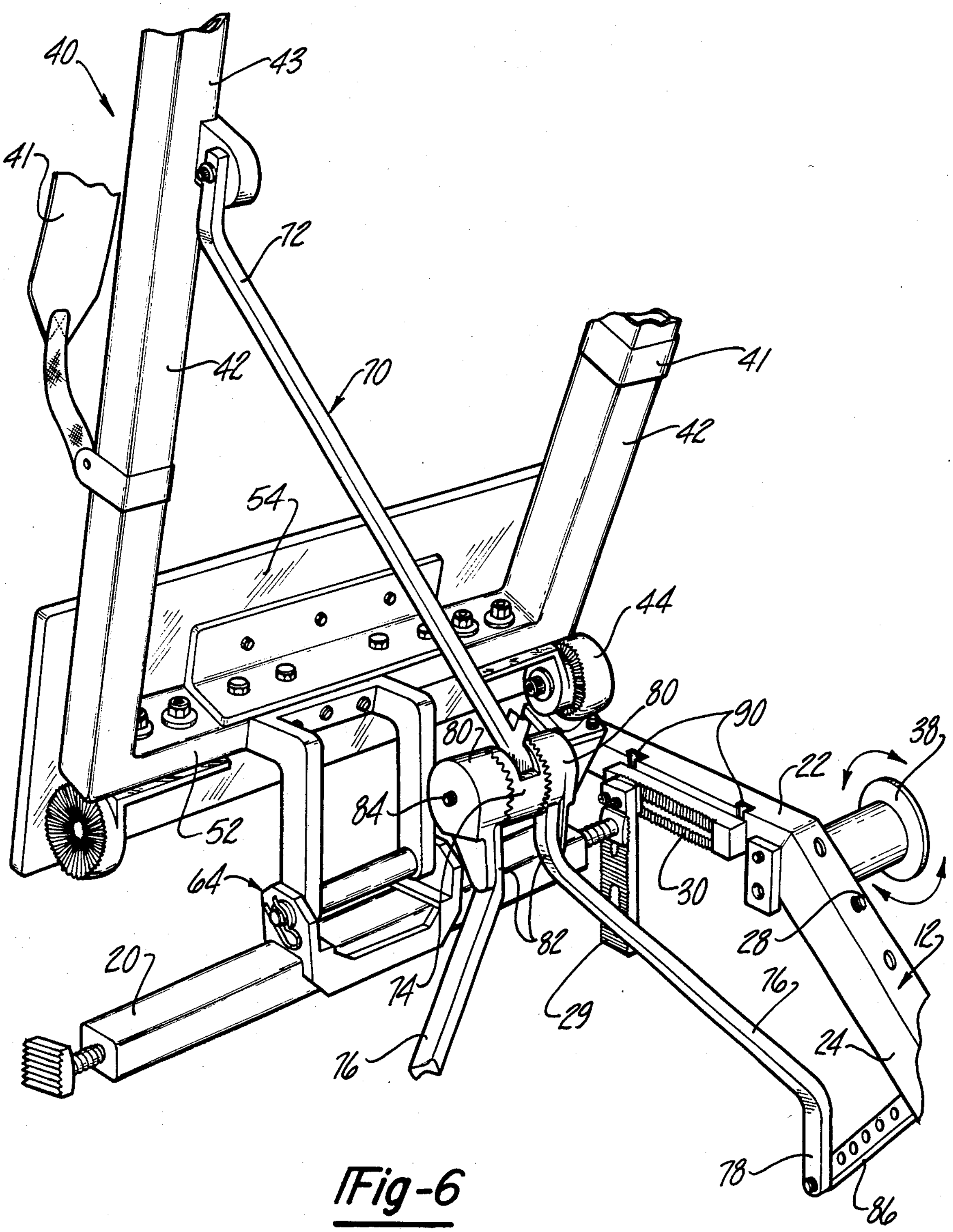
FIG. 6 is an elevated perspective view of the position adjusting means.

With reference now particularly to FIG. 6, each end of the front cross-support 20 is rotatably extendable so that frames 12 of different width can be utilized. Although the front cross-support 20 can be directly connected between lateral supports 14, in the preferred embodiment of the invention, each end of the front cross-support 20 is vertically adjustably secured to a vertically extending serrated plate 29. The plate 29, in turn, is longitudinally or horizontally adjustably secured to a horizontally extending serrated plate 30 attached to the lateral support 14. The serrated plates 29 and 30 thus allow both the vertical and horizontal position of the front cross-support 20 to be adjusted within the limits of the plates 29 and 30 for a reason to be subsequently described in greater detail.

With reference again to FIGS. 1 and 2, a castor wheel 32 is secured to and depends downwardly on each side of the rear end 18 of the frame 12. Similarly, a castor wheel 34 is secured to the lower and outermost ends of each extension 26 so that the wheels 32 and 34 rotatably support the frame 12 on a ground support surface. In addition, a large diameter spoked wheel 36 is rotatably mounted by an axle 38 to the front end 22 of each lateral support 14. The wheel 36 is detachably mounted in order to permit simple removal of the wheel 36 for storage or transportation of the device. In addition, the entire device can be supported on the wheels 32 and 34 thereby permitting the user to conduct lateral exercises without the impedence of the spoked wheels 36.

The large diameter or proportion wheel 36 is of the type commonly found on wheelchairs and is dimensioned so that it also engages the ground support surface along with the wheels 32 and 34. In the event that a different diameter wheel 36 is employed with the wheelstand, the position of the extension 26 with respect to the sleeves 24 is adjusted so that all six wheels again engage the ground support surfaces. Typically, a smaller wheel 36 will be attached to the frame 12 for a child than for an adult.

Figure 3:
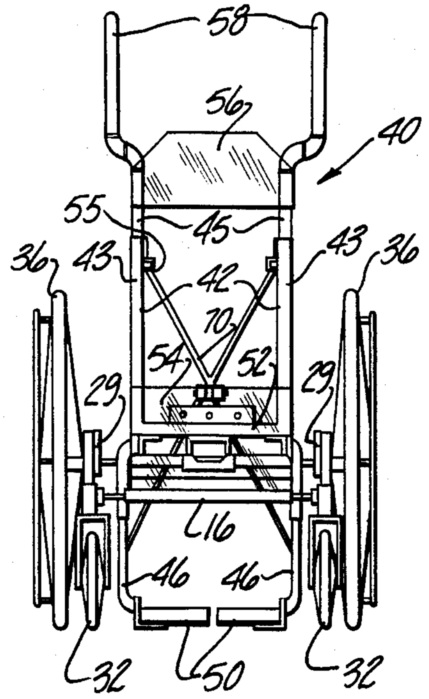
FIG. 3 is a rear plan view of the present invention.

With reference now particularly to FIGS. 1 and 3, an elongated and generally rectangular user support 40 is secured to and carried by the front cross member 20 in a fashion which will be subsequently described in greater detail. The user support 40 comprises a pair of elongated rails 42 which are spaced apart and generally parallel to each other. Pivotally secured to the lower portion of each rail 42 is tubular leg support 44. The leg support 44 telescopically receives an extension 46 within its interior while conventional locking means secure the extensions 46 to their respective leg supports 44 at a plurality of different positions. A lower foot support 50 is pivotally secured to the free or lower end of each extension 46. The adjustable attachment between the leg support 44 and extensions 46 and their respective rails 42 thus allows the foot supports 50 to be adjusted in accordance with the size of the user.

The leg supports 44 are also independently pivotally adjustable to permit efficient collapse of the leg supports 44 adjacent the rails 42 during storage. In addition, the leg supports 44 may be independently adjusted in order to force the user to support his or her weight on one leg by placing one support 44 in a substantially perpendicular position. By alternating this procedure between the individual supports 44, the leg muscles are strengthened and atrophy slowed.

Figure 7:
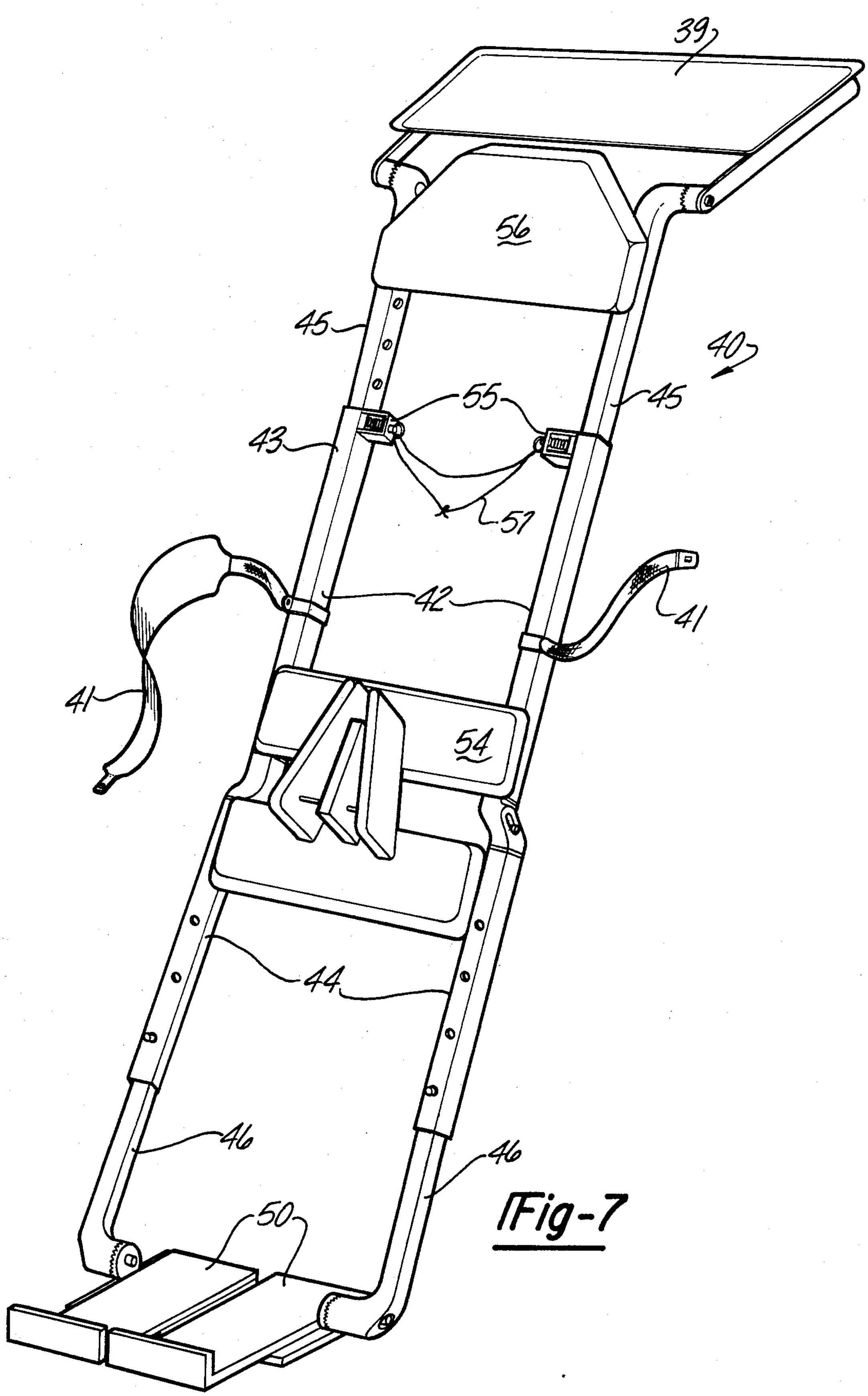
FIG. 7 is an elevated perspective view of an alternative embodiment of the user support structure.

Pivotally secured to the upper portion of each rail 42 is a handle bar 58, which, as an alternative, may be removed and replaced by a utility tray 39, as is shown in FIG. 7. As a further alternative, the utility tray 39 may be attached directly to the handle bars 58. Furthermore, in order to improve user safety, a belt 41 secured at each end to the rails 42 may be detachably secured around the waist of the user.

Figure 5:
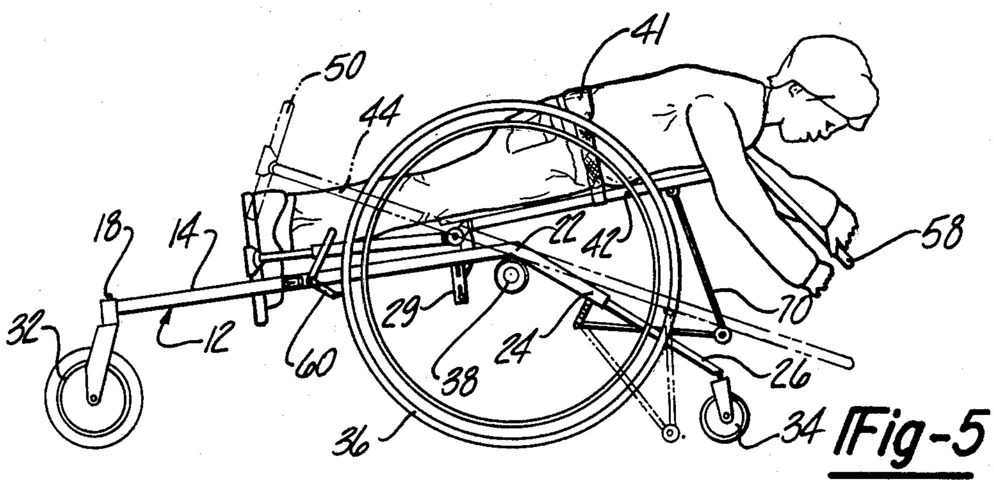
FIG. 5 is a side plan view of the present invention in a substantially horizontal position.

Still referring to FIGS. 1 and 3 in the preferred embodiment of the invention, the elongated rails 42 generally comprise rail sleeves 43 which telescopically receive extensions 45. The rails 42 are secured together at their lower end by a cross member 52. A torso plate 54 extends between the rail members 42 and is secured to the cross member 52. Similarly, a chest plate 56 extends between the top of the rail members 42, or alternately between the rail extensions 45, to support the body of the user as best shown in FIG. 5. An alternative user support structure 40 is shown in FIG. 7. The longitudinal position of the chest plate 56 may be altered by disengaging locking members 55 which are attached to the top of the rail sleeves 43. In order to permit simple and efficient disengagement of the locking members 55, a string 57 or similar connecting means, permits simultaneous disengagement of the locking members 55 by drawing on the string 57. Once unlocked, the position of the chest plate 56 may be slidably changed for increased comfort.

With reference again to FIGS. 1 and 2, a manually operated brake 60 is pivotally secured to each lateral support 14 at a position accessible to a user. Upon actuation, these brakes 60 engage the wheels 36 to slow or stop the wheelstand.

Figure 4:
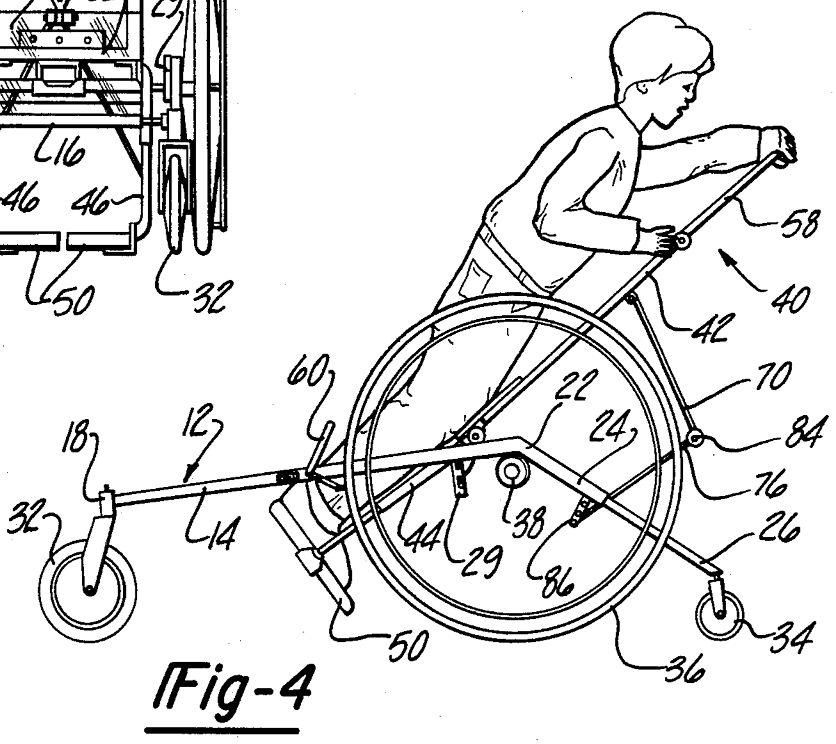
FIG. 4 is a side plan view of the present invention in an intermediate position.

With reference now generally to FIGS. 4–6, and particularly FIG. 6, a hinge 64 pivotally secures the structure cross support 52 to the front frame cross support 20 at a position spaced rearwardly of the axis of the wheels 36. This hinge 64 thus enables the support structure 40 to pivot from an upright position, as shown in FIG. 2, to an upper intermediate position as shown in FIG. 4, and to lower positions shown in both solid and phantom line in FIG. 5. Moreover, since the hinge 64 is spaced rearwardly from the axis of the wheels 36, and also since the castor wheels 34 are positioned forwardly of the wheels 36, stability of the wheelstand is maintained regardless of the angular position of the body support structure 40. Furthermore, as shown in FIGS. 2 and 5, the pivotal connection 64 between the support structure 40 and the frame 12 is within the outer circular periphery of the wheels 36 and closely adjacent the axis of the wheels 36 so that the wheels 36 are easily accessible to the hands of the user regardless of the pivotal position of the support structure 40.

With reference still in FIGS. 4–6, in order to lock the structure 40 to the frame 14 at any desired angular position, a V-shaped strut 70 has its upper or free ends 72 pivotally secured to the side rails 42 at a position spaced upwardly from the structure cross member 52. The lower end of apex of the V-shaped strut 70 is secured to a disc 74 (FIG. 6) having serrated axial ends.

Similarly, a pair of struts 76 each have one end 78 pivotaly mounted to the frame 12 adjacent the free end of the sleeves 24. A disc 80 having one serrated end is secured to the opposite end 82 of each strut 76 and these discs 80 are positioned so that the disc 74 is sandwiched in between the disc 80 and so that the serrations on the discs 74 and 80 mesh with each other. A bolt 84 extends axially through the disc 80 and 74 so that, upon tightening, the bolt 84 locks the discs 80 and 74 together. In addition, the lower end 78 of each strut 76 is preferably detachably secured to an adjustable bracket 86 in order to provide adjustment of the position of the strut 76 with respect to the main frame 12.

With reference now particularly to FIGS. 2 and 4, in order to move the support structure from the position shown in FIG. 2 and to the position shown in FIG. 4, the bolt 84 is loosened and the upper structure is pivoted through the hinge 64 to the position shown in FIG. 4. In doing so, the struts 70 and 76 pivot into an obtuse angular position with respect to each other. The bolt 84 is then tightened thus locking the struts 70 and 76 together and locking the support structure 40 at the angular position as shown in FIG. 4.

In order to further lower the support structure 40, for example, to the position shown in FIG. 5, the bolt 84 is again loosened and the support structure 40 is pivoted downwardly. When the desired angular position of the support structure 40 is obtained, the bolt 84 is again tightened thus locking the strut 70 and 76 together as well as locking the angular position of the support structure 40 to the frame 12.

Regardless of the angular position of the support structure 40 with respect to the frame 12, the propulsion wheel 36 is always accessible to the user supported on the support structure 40. Consequently, the user is able to propel the wheelstand regardless of the angular position of the support structure 40.

It is highly desirable to maintain the center of gravity substantially directly above the axes of the propulsion wheels 36 in order to increase the handling ability of the wheelstand. Furthermore, for different users having different weights and body weight distribution, it is highly desirable to adjust the longitudinal position of the support structure along the frame 12. For this reason, the lateral supports 14 (FIG. 1) preferably include a plurality of vertically extending slots 90 formed along their inside. These slots 90 are adapted to slidably receive and support the horizontal serrated bar 30 (FIG. 6) at different longitudinal positions along the main frame 12. To do this, the horizontal bar 30 together with the front cross support 20 in the attached support structure 40 are simply moved longitudinally along the main frame 12 until the desired weight distribution is obtained.

From the foregoing, it can be seen that the present invention provides an improved self transportation means for handicapped and/or immobile persons which is relatively simple and inexpensive in construction and yet totally effective in use. The wheelstand enables the user to assume a plurality of different angular positions while still maintaining the ability of self propulsion by simply rotating the wheels 36. Moreover, the multiple adjustments of the support structure 40 allows use for both children and adults. Additionally, storage and transportation can be quickly and efficiently accomplished by disassembling the major components of the device. The larger spoked wheels 36 and the support structure 40 can be easily detached from the frame 12. In order to further reduce the device, the leg supports 44 and the handle bars 58 may be rotatably collapsed to the rails 42, and the elongated extensions 26 may be removed or fully retracted into the sleeves 24.

Having described my invention, however, many modifications thereto will become apparent to those skilled in the art to which it pertains without deviation from the spirit of the invention as defined by the scope of the appended claims.

I claim:

1. An ambulatory wheelstand comprising:

an elongated frame having a front end and a rear end;

at least one wheel attached to said frame adjacent said rear end;

at least two axially aligned wheels rotatably secured to an axis at a midpoint of said frame, said wheels having an outer circular periphery;

an articulated user support structure, means for pivotally attaching said user support structure to said frame about a pivotal axis, wherein said support structure is normally maintained in a substantially planar position thereby maintaining the user in a substantially erect position and wherein said support structure comprises a planar torso support, a pair of leg supports pivotally attached to the bottom end of said torso support and a foot rest pivotally secured to each leg support;

said pivotal axis being within the outer circular periphery of said aligned wheels and closely adjacent the axis of said aligned wheels so that the distance between the hands of a person supported on said support structure and the outer periphery of said aligned wheels is substantially constant despite the pivotal position of said support structure, means for adjusting the pivotal position of said user support structure relative to said frame; and said axially aligned wheels being dimensioned to be manually grasped and rotated by the user from any angular position of said user support structure.

2. The ambulatory wheelstand as defined in claim 1 and comprising means for adjusting the longitudinal position of said at least one footrest with respect to said support structure.

3. The ambulatory wheelstand as defined in claim 1 and comprising a handlebar, and means for pivotally mounting said handlebar to said support structure.

4. The ambulatory wheelstand as defined in claim 1 and comprising a utility tray and means for pivotally mounting said utility tray to said support structure.

5. The ambulatory wheelstand as defined in claim 1 and comprising means for longitudinally adjustably securing said support structure to said frame.

6. The ambulatory wheelstand as defined in claim 1 wherein said torso support means is extendably adjustable.

7. The ambulatory wheelstand as defined in claim 1 wherein said frame comprises a cross member adjacent its front end, said support structure comprising a cross member at a midpoint and wherein said adjusting means comprises a hinge connected between said frame cross member and said support structure cross member.

8. The ambulatory wheelstand as defined in claim 7 and comprising means for locking said support structure to said frame at a plurality of different angular positions.

9. The invention as defined in claim 8 wherein said locking means comprises:

a first elongated strut having one end pivotally secured to said support structure, a second elongated strut having one end pivotally secured to said frame, and means for detachably securing the other ends of said struts together at a plurality of different angular positions.

10. The invention as defined in claim 1 and comprising means for both longitudinally and vertically adjustably securing said support structure to said frame.

11. The ambulatory wheelstand as defined in claim 1 and comprising at least one stabilizing wheel rotatably mounted to said frame forwardly of said aligned wheels.

12. The ambulatory wheelstand as defined in claim 11 further comprising means for longitudinally adjustably securing said stabilizing wheel to said frame.

13. The ambulatory wheelstand as defined in claim 1 further comprising means attached to said frame for manually braking said aligned wheels.

* * * * *